United States Patent [19]

Oswald et al.

[11] Patent Number: 4,850,786
[45] Date of Patent: Jul. 25, 1989

[54] CONTAINER HANDLING APPARATUS

[75] Inventors: Norman D. Oswald, Duncanville; Carl M. Franklin, Midlothian; Marc H. Gutzler, Duncanville; Harry S. Mankey, Dallas, all of Tex.

[73] Assignee: Standard Manufacturing Company, Dallas, Tex.

[21] Appl. No.: 163,233

[22] Filed: Feb. 26, 1988

Related U.S. Application Data

[63] Continuation of Ser. No. 90,439, Aug. 26, 1987, abandoned, which is a continuation of Ser. No. 868,196, May 23, 1986, abandoned, which is a continuation of Ser. No. 569,604, Jan. 10, 1984, abandoned.

[51] Int. Cl.$^4$ ............................................. B60P 3/00
[52] U.S. Cl. .................................... 414/460; 180/208; 280/656; 280/704; 294/81.2; 296/26
[58] Field of Search ................................ 414/458–461, 414/495, 498; 180/24.02, 41, 22, 208; 280/656, 704, 705; 296/26, 204; 294/81.1, 81.2, 81.53

[56] References Cited

U.S. PATENT DOCUMENTS

| | | | |
|---|---|---|---|
| 1,674,967 | 6/1928 | Fitch | 294/67 DA X |
| 1,836,446 | 12/1931 | Christie | 180/9.1 |
| 1,858,784 | 5/1932 | Masury | 180/72 |
| 1,902,712 | 3/1933 | Leipert | 180/24.11 |
| 1,938,498 | 12/1933 | Porcello | 180/72 |
| 1,938,847 | 12/1933 | Masury | 180/72 |
| 2,024,199 | 12/1935 | Barnes et al. | 180/72 |
| 2,044,306 | 6/1936 | Kegresse | 180/6.54 |
| 2,091,509 | 8/1937 | Kramer | 180/24.11 |
| 2,269,728 | 1/1942 | Mills | 280/81.6 |
| 2,299,006 | 10/1942 | De L. Brown | 180/24.11 |
| 2,319,978 | 5/1943 | Collender | 280/80 R |
| 2,361,496 | 10/1944 | Pointer | 180/24.02 X |
| 2,890,064 | 6/1959 | Hudson | 280/112 A |
| 3,105,700 | 10/1963 | Hardman | 280/685 |
| 3,145,864 | 8/1964 | Arnold | 414/461 |
| 3,165,331 | 1/1965 | Hardman et al. | 280/104 |
| 3,299,978 | 1/1967 | Sponsler | 180/24.02 X |
| 3,304,097 | 2/1967 | Lewis | 280/676 |
| 3,372,766 | 3/1968 | Lifferth | 180/22 X |
| 3,387,726 | 6/1968 | McKee et al. | 414/458 |
| 3,494,491 | 2/1970 | Sumida | 414/460 |
| 3,525,534 | 8/1970 | Madler et al. | 280/104 |
| 3,556,580 | 1/1971 | Bridge | 294/815 F |
| 3,566,825 | 3/1971 | Ruf | 180/9.1 X |
| 3,656,572 | 4/1972 | Mercier | 180/21 |
| 3,688,931 | 9/1972 | Tax et al. | 414/460 |
| 3,698,581 | 10/1972 | Goyarts | 414/460 |
| 3,703,243 | 11/1977 | Monk | 414/460 |
| 3,809,004 | 5/1974 | Leonheart | 180/22 X |
| 3,874,719 | 4/1975 | Goyarts | 294/815 F |
| 3,930,550 | 1/1976 | Rose et al. | 180/24.08 |
| 4,056,158 | 11/1977 | Ross | 180/24.02 X |
| 4,122,962 | 10/1978 | Goodwin | 414/460 |
| 4,258,949 | 3/1981 | Keagbine | 294/67 DA X |
| 4,285,627 | 8/1981 | Oswald et al. | 180/6.48 X |
| 4,310,173 | 1/1982 | Varady | 280/704 |
| 4,315,631 | 2/1982 | Rainville | 280/104 X |
| 4,325,443 | 3/1982 | Fischer et al. | 180/6.54 |
| 4,432,690 | 2/1984 | Monk | 414/460 |
| 4,454,925 | 6/1984 | Oswald et al. | 180/22 |
| 4,595,069 | 6/1986 | Oswald et al. | 180/24.02 |
| 4,600,069 | 7/1986 | Oswald et al. | 180/24.02 |

FOREIGN PATENT DOCUMENTS

| | | |
|---|---|---|
| 2146723 | 3/1973 | Fed. Rep. of Germany ...... 280/704 |
| 1308726 | 2/1963 | France . |
| 169000 | 11/1965 | U.S.S.R. . |

OTHER PUBLICATIONS

Description of Stradco Airport & Depot Straddle Carrier, The Straddle Carrier Corporation, Material not dated.

Primary Examiner—David A. Bucci
Attorney, Agent, or Firm—Michael A. O'Neil

[57] ABSTRACT

A container handling apparatus (30) includes longitudinally extending primary frames (36, 38) and a cross frame (34) which interconnects the front ends of the primary frames. Lift masts (72, 74, 76 78) are mounted on the primary frame (36, 38) and extend upwardly therefrom. A load beam (80) is supported from the lift masts (72, 74, 76 78) and includes latching mechanisms (96) adapted for connection to a container. Secondary frames (50) are pivotally supported on the primary frames (36, 38) are in turn rotatably support driven wheel members (52). The pivotal relationship between the secondary frames (50) and the primary frames (36, 38) is regulated and controlled by spring/shock absorber/cylinder assemblies (54). The cross frame (34) is selectively retractable and the load beam (80) is selectively foldable to reduce the width of the apparatus.

1 Claim, 7 Drawing Sheets

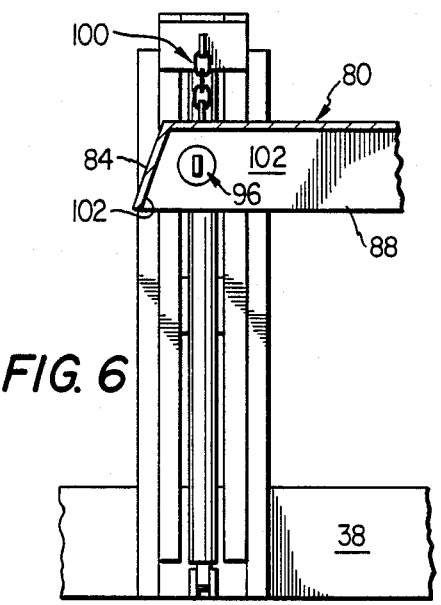
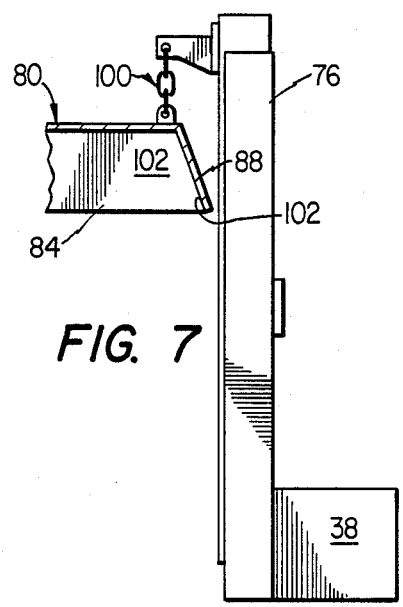
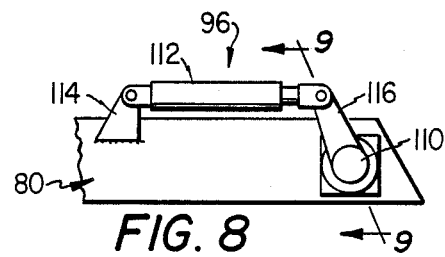
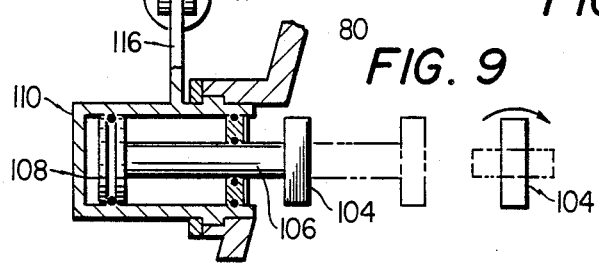
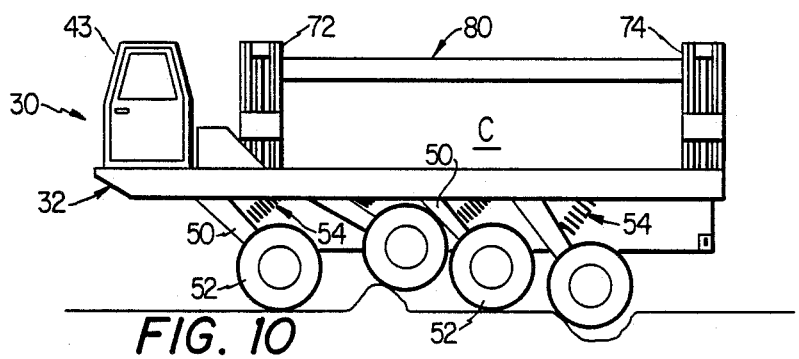

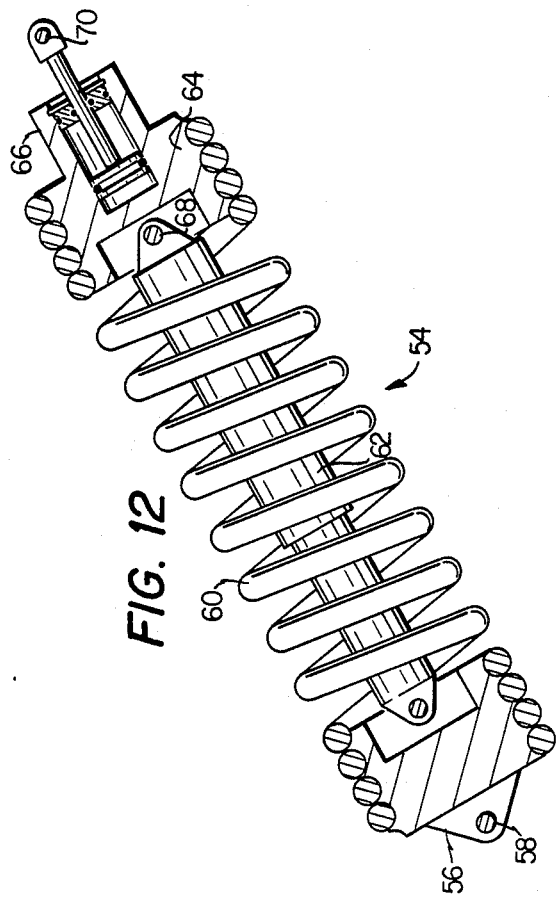
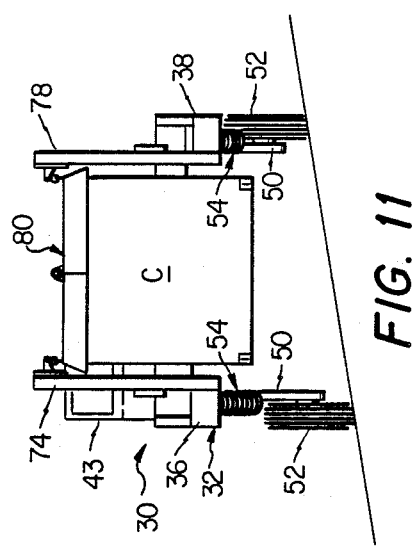
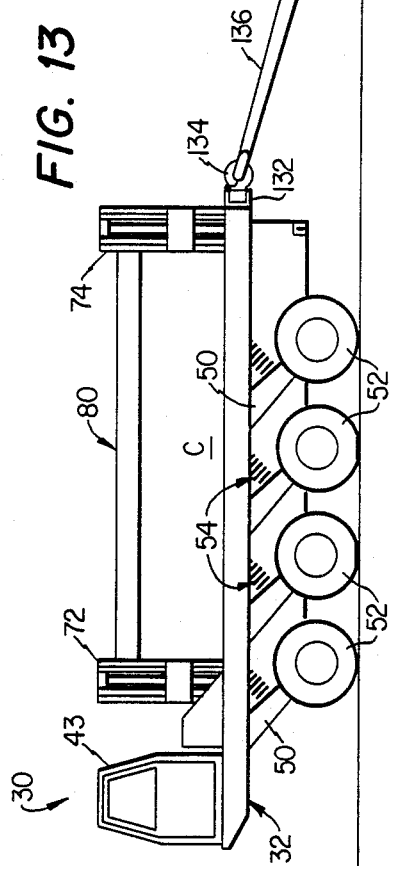

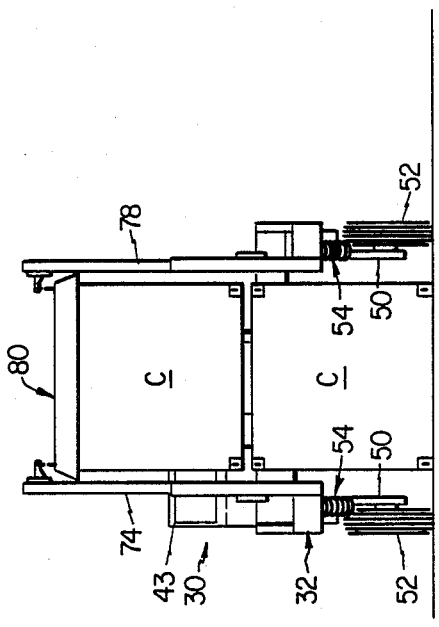
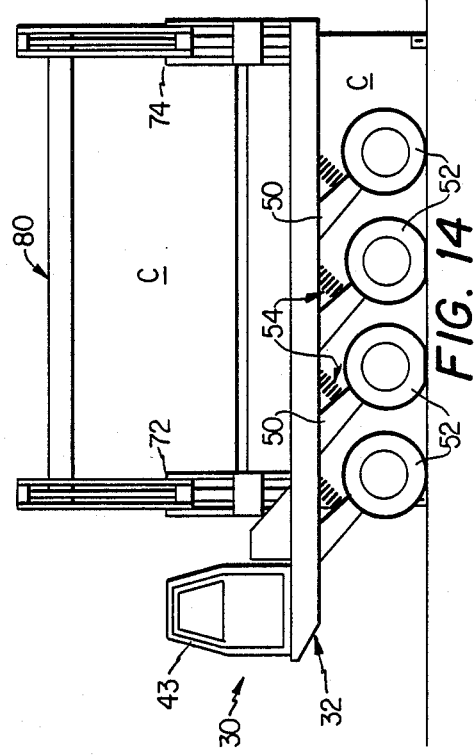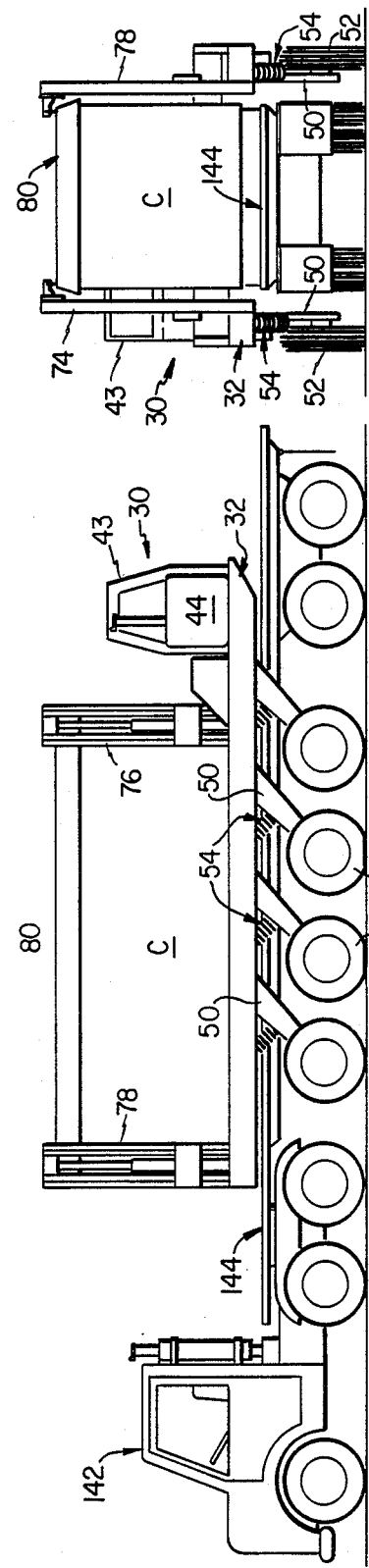

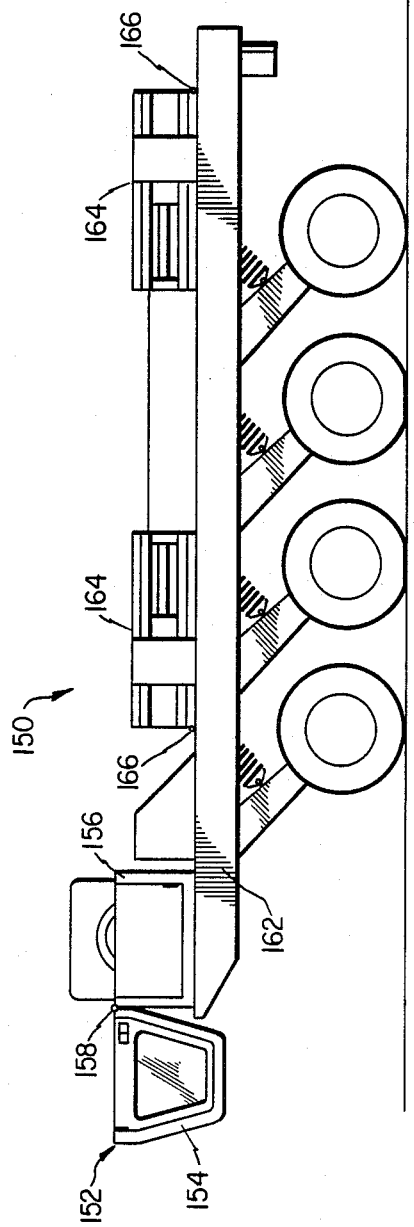
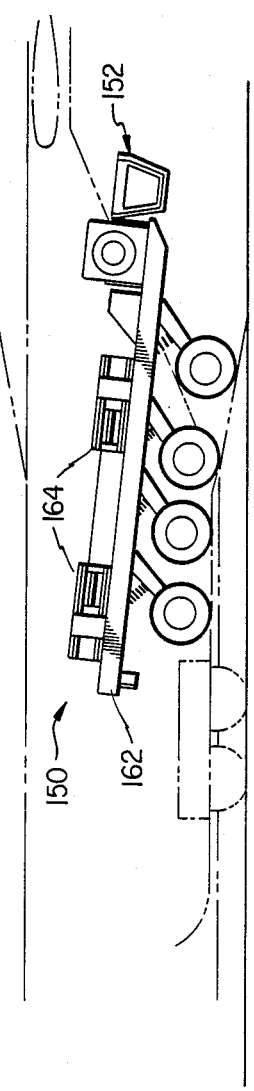
FIG. 18
FIG. 19

CONTAINER HANDLING APPARATUS

CROSS REFERENCE TO RELATED APPLICATIONS

This application is a continuation of Application Ser. No. 090,439, filed Aug. 26, 1987, now abandoned, which is a continuation of application Ser. No. 868,196, filed May 23, 1986, now abandoned, which is a continuation of application Ser. No. 569,604, filed Jan. 10, 1984, now abandoned.

TECHNICAL FIELD

The present invention relates generally to the handling of 8'×8'×20' containers of the type commonly utilized in the transportation and temporary storage of goods and materials, and more particularly to apparatus for handling such containers under a variety of conditions, particularly including various types of adverse terrain.

BACKGROUND AND SUMMARY OF THE INVENTION

At the present time, containers are utilized in the transportation and temporary storage of virtually all types of goods and materials. Typically, these containers have dimensions of 8'×8'×20', although 30' and 40' containers are also used. Presently available apparatus for handling such containers include bridge cranes, stradle carriers, and forklift trucks.

Bridge cranes comprise permanent installations which are utilized at locations such as harbors to manipulate containers onto and off of ships, barges, and the like. Although satisfactory for the intended purpose, bridge cranes cannot be utilized for the transportation of containers and cannot be utilized to handle containers at remote locations. Stradle carriers comprise high, wide devices which carry containers in an elevated orientation. For this reason, stradle carriers tend to tip over when operated on soft or inclined surfaces. In order to transport a container by means of a forklift truck, the length of the container must extend transversely to the direction of movement. This requires unnecessarily wide roadways, gates, doorways, etc., and also presents a safety problem since the forklift truck operator cannot see around the container during forward movement.

The foregoing problems become even more critical when containers are utilized in military applications. For example, landing craft are typically utilized to transport war material to beachheads. Stradle carriers are too large to enter landing craft, and the landing craft doors are not sufficiently wide to permit the removal of containers therefrom in a sideways orientation. Additionally, neither stradle carriers nor forklift trucks are adapted for operation either in the surf, or on sand, or on highly inclined surfaces of the type often encountered at beachheads. For this reason the present practice is to utilize a two-wheel trailer operated by a bulldozer or similar device to remove containers from landing craft and to move the containers through the surf and across the beach to a suitable location. At this point a stradle carrier or a forklift truck or crane is utilized to place the container on a transportation vehicle. The transportation vehicle then hauls the container to its ultimate destination, whereupon a second forklift truck or stradle carrier is utilized to remove the container from the transportation vehicle. It will thus be understood that up to five pieces of equipment may be required in order to accomplish the relatively straight forwar d task of moving a container from the interior of a landing craft to its ultimate destination.

Even at installations such as military bases and the like, current procedures for handling containers are unsatisfactory. Thus, containers are typically received at a central location from railroad cars, semi-trailers, etc. However, due to space limitations, neither stradle carriers nor forklift trucks can be used to transport the containers from the central receiving location to the ultimate destinations such as mess halls, ammo dumps, etc. It is therefore necessary to unload each container at the central receiving location and to use trucks to transport the container contents to the ultimate destinations.

The present invention comprises a container handling apparatus which overcomes the foregoing and other problems long since associated with the prior art. In accordance with the broader aspects of the invention, a container handling apparatus is adapted to transport containers across adverse terrain, such as through surf, across beaches, and over highly inclined surfaces. The apparatus of the present invention is further adapted to transport containers across obstacles such as rocks, logs, craters and ditches, rubble, etc. Container handling apparatus incorporating the invention are characterized by the ability to operate at speeds of up to 45 m.p.h. or more in the unloaded configuration and speeds of up to 25 m.p.h. in the loaded configuration. Finally, the present invention comprises a container handling apparatus adapted to transport containers through relatively limited spaces, thereby facilitating both the removal of containers from landing craft and the positioning of containers at ultimate destinations without the necessity of unloading the contents of the containers onto trucks. It will thus be understood that the container handling apparatus of the present invention is adapted to remove containers from landing craft, to transport containers across extremely adverse terrain, to transport containers at higher speeds, and to position containers at the ultimate destinations thereof, all without requiring the use of any other apparatus whatsoever.

In accordance with more specific aspect of the invention, a container handling apparatus comprises a pair of longitudinally extending, elongate, hollow, load bearing, primary frames. A plurality of secondary frames are pivotally connected to the primary frames and extend angularly downwardly and rearwardly with respect thereto. Each secondary frame has a wheel rotatably supported at the distal end thereof. Transmission apparatus extends from a pair of drive motors through each elongate, hollow, primary frame and through the secondary frames to the wheels, so that operation of the drive motors effects concurrent rotation of all of the associated wheels. A spring/shock absorber/cylinder assembly is connected between each secondary frame and its associated primary frame for regulating and controlling the orientation of the secondary frame relative to the primary frame. This facilitates skid steering, regulation of the overall height of the container handling apparatus, and operation of the apparatus over inclined surfaces by providing independent wheel suspension.

A cross frame interconnects the front ends of the elongate hollow primary frames and supports an operator's compartment, an engine, and a pair hydraulic pumps driven by the engine for supplying hydraulic fluid to the drive motors. Conventional forklift masts are mounted on the primary frames and in turn support a rectangular load beam. The load beam is self centering relative to containers received therein and is provided with apparatus for latching engagement with the latch lugs of the containers. The cross frame is selectively retractable and the load beam is selectively foldable to reduce the overall width of the container handling apparatus. By this means the apparatus is adapted for use on highways and in other limited width situations whenever it is not used to transport a container.

The forklift masts have a pin-clevis type attaching point ot the primary frames so that by removing one pin connection the mast may be rotated about the other pin to a horizontal position resting on the primary frame thus reducing the overall vehicle height for air transport type shipment. The vehicle cab also has a pin-clevis type attaching point so that the upper portion of the cab can be rotated forward to reduce the overall vehicle height for air transport type shipment.

DESCRIPTION OF THE DRAWINGS

A more complete understanding of the invention may be had by reference to the following Detailed Description when taken in conjunction with the accompanying Drawings, wherein:

FIG. 6 is an enlarged partial sectional view of the lifting apparatus of FIG. 2;

FIG. 7 is an enlarged partial sectional view of the lifting apparatus of FIG. 2;

FIG. 8 is an enlarged view showing part of the lift beam of the container handling apparatus of FIG. 1, and in particular, the latching apparatus thereof;

FIG. 9 is a further illustration of the latching apparatus of the lift beam;

FIGS. 10 and 11 are illustrations of the operation of the container handling apparatus of FIG. 1 over adverse terrain;

FIG. 12 is an illustration of the spring/shock absorber/cylinder assemblies utilized in the container handling apparatus of FIG. 1; and FIGS. 13, 14, 15, 16, and 17 are diagramatic illustrations of various container handling applications of the apparatus of FIG. 1; and FIGS. 18 and 19 are diagramatic illustrations of an air transportable version of the apparatus of FIG. 1.

DETAILED DESCRIPTION

Figure 1:
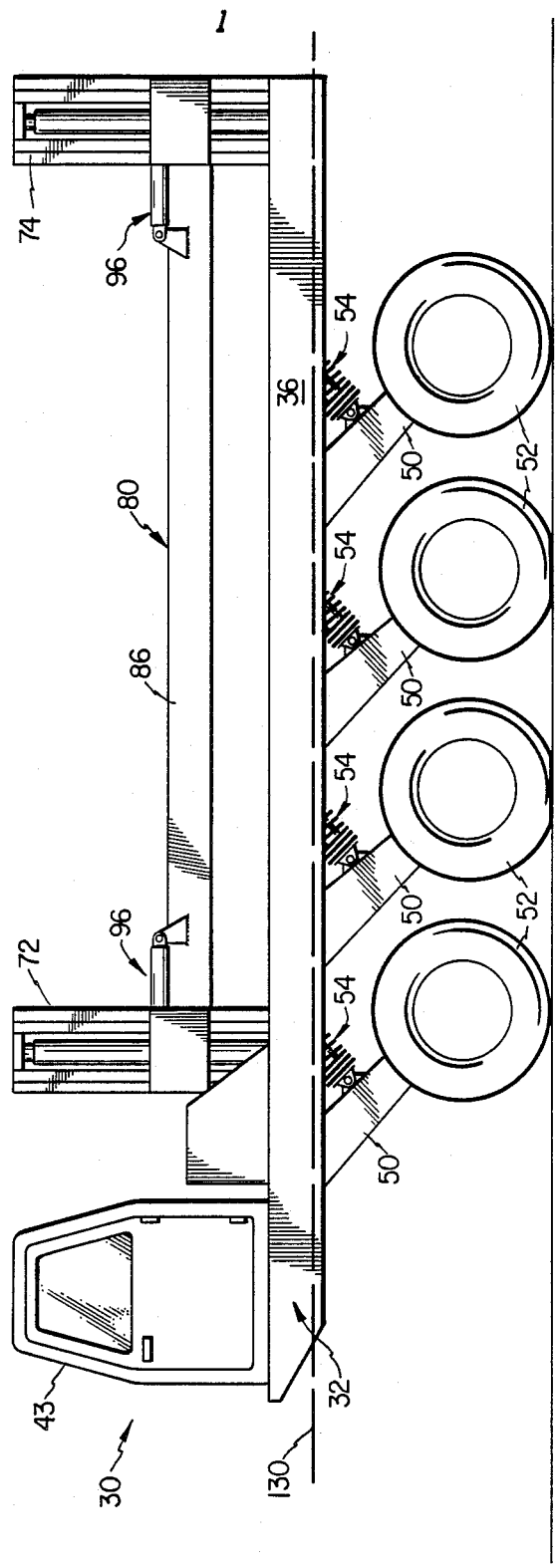
FIG. 1 is a side view of a container handling apparatus incorporating the invention.
Figure 2:
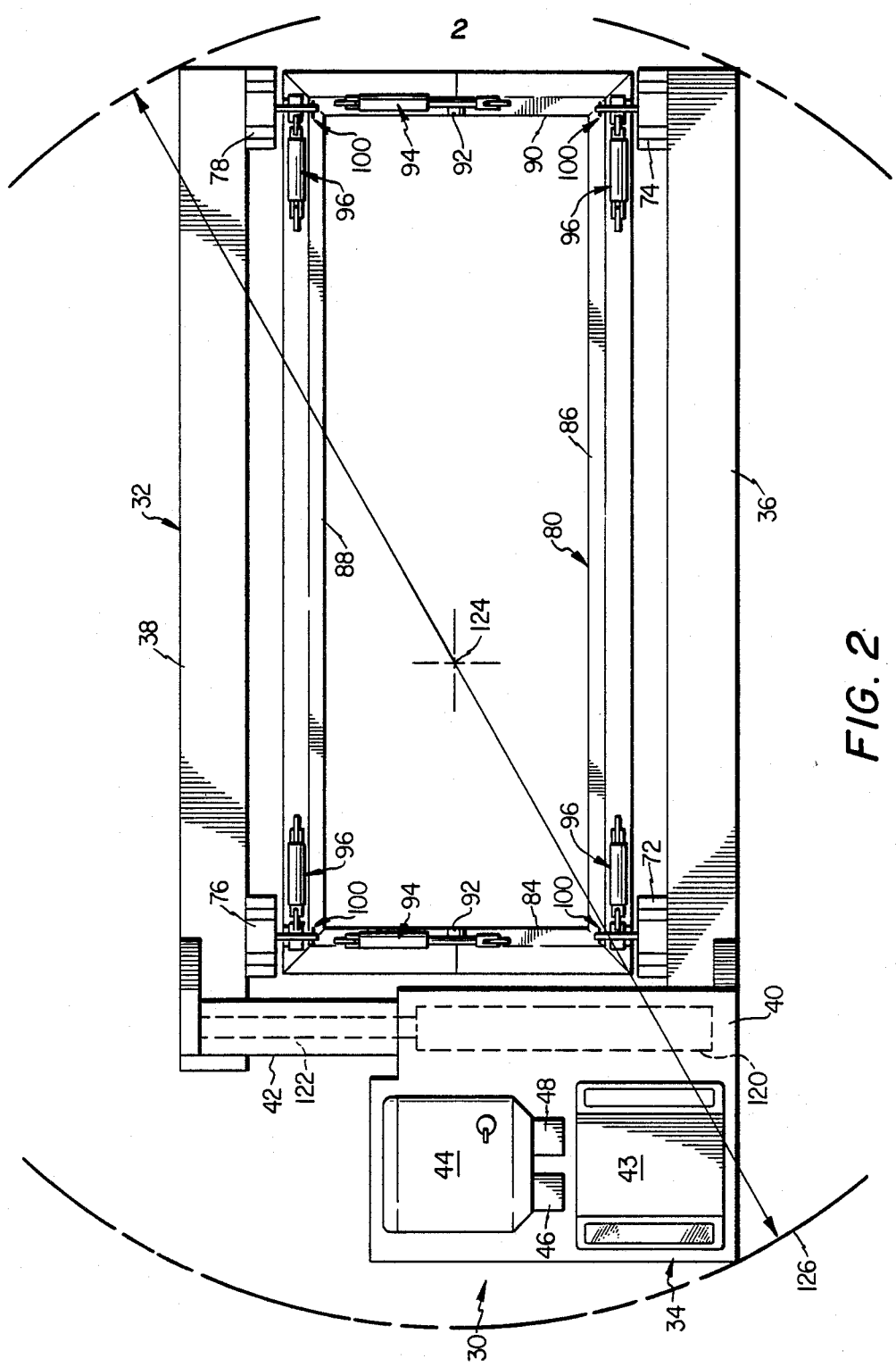
FIG. 2 is a top view of the container handling apparatus of FIG. 1.
Figure 3:
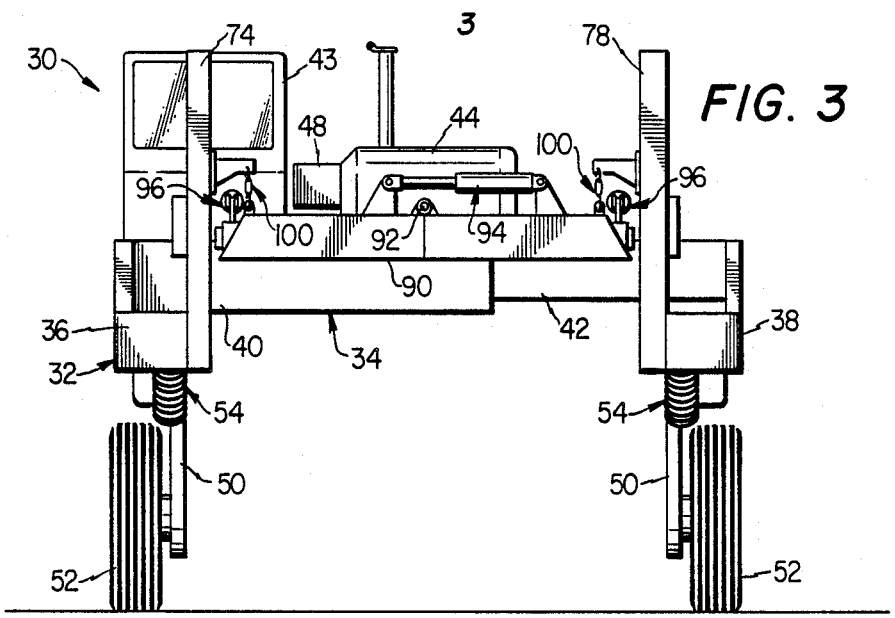
FIG. 3 is a rear view of the container handling apparatus of FIG. 1.

Referring now to the drawings, and particularly to FIGS. 1, 2 and 3 thereof, there is shown a container handling apparatus 30 incorporating the preferred embodiment of the invention. The apparatus 30 includes a frame 32 comprising a cross frame 34 extending transversely across the front end of the apparatus 30 and a pair of longitudinally extending, elongate, hollow, primary load bearing frames 36 and 38. The cross frame 34 includes a main portion 40 connected to the front end of the primary frame 36 and an extendable portion 42 connected to the front end of the primary frame 38.

The main portion 40 of the cross frame 34 supports an operator's compartment 43. The operators compartment 43 is preferably provided with dual controls to facilitate a rearward facing operator orientation during use of the apparatus 30 in container receiving and positioning and a forward facing operator orientation during use of the apparatus 30 in container transportation mode. The main portion 40 of the cross frame 34 further supports an engine 44 which drives a pair of hydraulic pumps 46 and 48. The engine 44 may comprise a compression/ignition engine, a diesel engine, or any other type of engine in accordance with particular applications of the invention.

Referring particularly to FIG. 1, the primary frames 36 each have a plurality of secondary frames 50 extending angularly downwardly and rearwardly therefrom. Each secondary frame 50 is pivotally connected to its associated primary frame and in turn rotatably supports a wheel member 52. The wheel members 52 preferably comprise rims and pneumatic tires of the type conventionally used in automotive applications, although other types of wheel members may be utilized in the practice of the invention in accordance with particular requirements.

Referring to FIG. 12, the pivotal relationship between each secondary frame 50 and its associated primary frame is regulated and controlled by a spring/shock absorber/cylinder assembly 54. A clevis 56 is pivotally secured to each secondary frame 50 by a pin 58 and is in turn secured to a coil spring 60 and a shock absorber 62. At the opposite end of the assembly 54 the spring 60 is threadedly engaged with an end member 64. The end member 64 is secured to the shock absorber 62 and to a hydraulic cylinder 66 by a pin 68. The hydraulic cylinder 66 is in turn secured to the associated primary frame 36 or 38 by a pin 70.

Referring again to FIGS. 1, 2 and 3, the primary frame 36 supports a pair of lift masts 72 and 74 and the primary frame 38 supports a pair of lift masts 76 and 78. The lift masts 72, 74, 76 and 78 comprise commercially available devices of the type commonly utilized in the construction of forklift trucks. Various types of lift masts may be utilized in the practice of the present invention, although the use of triple section-type lift masts if preferred.

The lift masts 72, 74, 76 and 78 support a load beam 80. The load beam 80 comprises a front rail 84 extending adjacent and parallel to the cross frame 34 of the frame 32, a side rail 86 extending adjacent and parallel to the primary frame 36, a side rail 88 extending adjacent and parallel to the primary frame 38, and a rear rail 90 extending across the normally open rear end of the frame 32 of the container handling apparatus 30. The front rail 84 and the rear rail 90 are each provided with hinges 92. Hydraulic cylinders are provided for selectively folding the load beam 80 about the axis defined by the hinges 92. Latching mechanisms 96 are provided for connecting the load beam 80 to containers received therein.

Referring to FIGS. 6 and 7 lift masts 72, 74, 76 and 78 each have a lifting member. The load beam 80 is connected to the lifting members by means of chains 100. Also, the rails 84, 86 and 90 comprising the load beam 80 each have an angularly upwardly and inwardly inclined interior surface 102. The use of flexible connections between the lift masts and the load beam together with the use of angularly upwardly and inwardly inclined interior surfaces 102 on the rails comprising the load beam 80 causes the load beam to be self aligning absorber/cylinder assemblies 54 may also be operated to position all of the wheel members 52 in the same plane in those circumstances in which extreme stability is required.

Various operational features of the material handling apparatus are illustrated in the drawings. Referring specifically to FIG. 1, the rotational connections between the wheel members 52 and the secondary frames 50 and the pivotal connections between the secondary frames 50 and the primary frames 36 and 38 are completely sealed. This allows operation of the container handling apparatus 30 in rivers, lakes and other underwater applications having depths up to that of the plane 130. This particular feature of the present invention is highly advantageous in military applications wherein the unloading of containers from landing craft has heretofore been accomplished only with considerable difficulty. The present invention eliminates such difficulties in that the container handling apparatus 30 is adapted to move into a landing craft to receive containers therefrom, to transport containers from landing craft through the adjacent surf and across the beach, and to thereafter transport the containers at high speed to remote locations, all without the intervention of any other apparatus whatsoever.

FIG. 10 illustrates the operation of the container handling apparatus 30 over adverse terrain. The spring/shock absorber/cylinder assemblies 54 provide independent suspension for each of the wheel members 52. That is, each wheel member 52 is allowed to move upwardly in the case of logs, rocks, rubble, or similar obstacles; or downwardly in the case craters, ditches, etc., regardless of the positioning of the remaining wheel members 52. This is highly advantageous in that containers C transported by the container handling apparatus 30 are manipulated in a level and substantially impact-free condition regardless of the condition of the underlying surface.

FIG. 11 illustrates the operation of the container handling apparatus 30 to transport containers C over surfaces having substantial side slope. The spring/shock absorber/cylinder assemblies 54 are adapted to extend the wheel members 52 on one side of the apparatus 30 while retracting the wheel members 52 on the opposite side thereof. In this manner the container C may be transported in a substantially level orientation notwithstanding the grade of the underlying surface.

FIG. 13 illustrates the operation of the container handling apparatus 30 to transport multiple containers C. A towbar 132 may be secured to the rear ends of the primary frames 36 and 38 by conventional means. The towbar 132 supports a conventional pintle hook 134 which may be used to connect the towbar 136 of a conventional trailer 138 to the container handling apparatus 30 for towing thereby. The container handling apparatus 30 is adapted to position a first container C on the trailer 138, then to receive a second container C, and then to transport both of the containers C by means of the towbar 132, the pintel hook 134 and the tongue 136. It will be understood that the trailer 138 shown in FIG. 13 is illustrative only and that the container handling apparatus 30 is adapted to tow trailers having sufficient length to receive two or more containers, and to tow multiple trailers, in accordance with requirements of the particular applications of the invention.

FIG. 14 and 15 illustrate the operation of the container handling apparatus 30 to position one container C on top of another container C. The masts 72, 74, 76 and 78 are preferably of the triple section type. Such apparatus provides more than adequate vertical lift to permit the positioning of one container on top of another. The container stacking operation is accomplished by first positioning the lowermost container in the desired location and then securing the uppermost container in the load beam 80 of the container handling apparatus 30. The masts 72, 74, 76 and 78 are then operated to raise the uppermost container sufficiently that its bottom surface is located substantially above the top surface of the lowermost container. The container handling apparatus 30 is then operated backwards to receive the lowermost container in the open space between the primary frames 36 and 38 of the apparatus 30. When the uppermost container is properly located above the lowermost container the masts 72, 74, 76 and 78 are operated to lower the uppermost container onto the top of the lowermost container, whereupon the lowermost container is disengaged from the load beam 80.

FIGS. 16 and 17 illustrate the operation of the container handling apparatus 30 to position containers on vehicles such as semi-trailers, full trailers, flatbed trucks, and the like. The apparatus 30 has sufficient horizontal and vertical clearance to receive such vehicles between the primary frames 36 and 38 thereof. Thus, after a container C has been secured to the load beam 80 and lifted by means of the masts 72, 74, 76 and 78, the apparatus 30 may be operated backwards to position the container above a vehicle that will be utilized to transport the container. For example, in FIG. 16 the apparatus 30 is illustrated in the process of positioning a container C for transport by a semi-trailer which is operated by a tractor 142. The semi-trailer has a 40 foot length and is therefore adapted to receive and transport two containers C. The container handling apparatus 30 is readily adapted to position containers on the semi-trailer by positioning a first container C immediately adjacent to the tractor 142 and then positioning a second container C at the rear end of the semi-trailer. The container handling apparatus 30 is equally adapted to position containers on other types of vehicles.

In FIGS. 18 and 19, there is shown a container handling apparatus 150 comprising a version of the present invention which is particularly adapted for air transport. The container handling apparatus 150 includes an operators compartment comprising a cab 152 that is divided into an upper half 154 and a lower half 156. A hinge 158 pivotally interconnects the upper half 154 and the lower half 156. Suitable latching apparatus is employed to normally retain the upper half in contact with the lower half to define a substantially closed operators compartment. Whenever air transport of the container handling apparatus 150 is desired, the latching apparatus is released and the upper half 154 is pivoted about the hinge 158 to the position shown in FIGS. 18 and 19, thereby reducing the overall height of the apparatus.

The container handling apparatus includes a main frame 162. A plurality of forklift masts 164 are supported on the main frame 162 and are pivotally connected thereto by means of a plurality of hinges 166. Suitable latching apparatus is employed to normally retain the forklift masts 164 in upright orientations. Whenever air transport of the container handling apparatus 150 is desired, the latching apparatus are released, and the forklift masts 164 are pivoted about the hinges 166 into the position shown in FIGS. 18 and 19, thereby reducing the overall height of the apparatus.

with respect to containers received therein. This comprises a highly important feature of the invention in that it allows the load beam 80 of the container handling apparatus 30 to be automatically connected to, and subsequently to be automatically disconnected from a container without necessitating operator intervention.

The latching mechanisms 96 are shown in greater detail in FIGS. 8 and 9. Each latching mechanism 96 includes a T-shaped latching head 104 adapted for latching engagement with conventional latch lugs of the container. Each head 104 is mounted on a piston rod 106 which extends to a piston 108 adapted for reciprocation within a hydraulic cylinder 110. Thus, by selectively directing hydraulic fluid to the opposite ends of the cylinder 110 the piston 108 is operable through the piston rod 106 either to extend the head 104 into engagement with the latching lug of a container or to retract the head 104 out of engagement with the latching lug.

The hydraulic cylinder 110 is in turn supported for rotation about its longitudinal axis under the action of the hydraulic cylinder 112. Each hydraulic cylinder 112 is connected between a bracket 114 secured to the load beam 80 and an arm 116 connected to the associated hydraulic cylinder 110. The hydraulic cylinders 112 function to rotate the hydraulic cylinders 110 and therefore the heads 104 through 90°. Thus, after the head 104 has been engaged with the latch lug of a container under the action of the hydraulic cylinder 110, the hydraulic cylinder 112 is actuated to rotate the head 104 thereby preventing inadvertent disengagement between the head 104 and the latch lug of the container.

Figure 4:
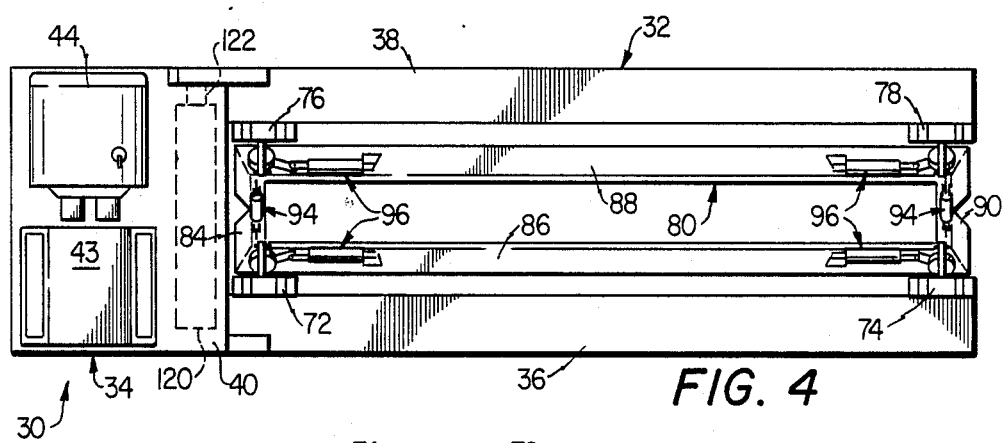
FIG. 4 and FIG. 5 are views similar to FIGS. 2 and FIG. 3, respectively, showing the container handling apparatus in a reduced width configuration.

Referring now to FIGS. 2 and 4, the extendable portion 42 is mounted for sliding movement into and out of the main portion 40 of the cross frame 34. A hydraulic cylinder 120 is mounted in the main portion 40 of the cross frame 34 and includes a piston rod 122 which is connected to the extendable portion 42. Upon extension of the piston rod 42 out of the cylinder 120 and forward movement of the vehicle, the extendable portion 42 is moved outwardly from the main portion 40 of the cross frame 34, and the primary frame 38 and the wheel members 52 carried thereby are simultaneously moved away from the primary frame 36 and the wheel members 52 thereof and are thus positioned as shown in FIG. 2. It will be understood that the component parts of the container handling apparatus must be positioned as shown in FIG. 2 in order to receive, lift and transport a container therein.

Figure 5:
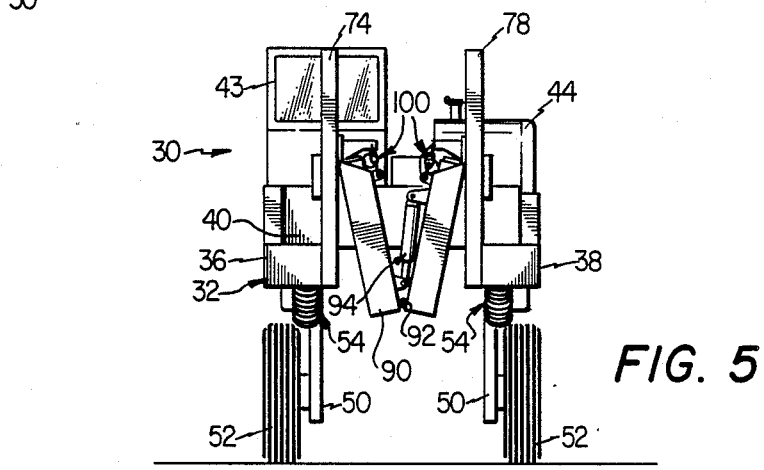

In certain circumstances it will be necessary to operate the container handling apparatus 30 over conventional highways or in other situations characterized by reduced lateral clearance. In such instances the cylinder 120 is actuated to retract the piston rod 122 thereby moving the primary frame 38 toward the primary frame 36. Simultaneously the cylinders 94 are actuated to fold the load beam 80 about an axis defined by the hinges 92. The end result of these operations is illustrated in FIGS. 4 and 5 and comprises a substantial reduction in the overall width of the material handling apparatus 30.

The material handling apparatus 30 is propelled by means of the wheel members 52, all of which are driven. The apparatus 30 is provided with a pair of variable displacement hydraulic motors each individual to one of the primary frames 36 and 38 and each driven by pressurized hydraulic fluid supplied from one of the pumps 46 and 48. The output of each variable displacement hydraulic motor is connected to its associated wheel members 52 through a planetary gearbox and a drive train extending through its associated primary frame 36 or 38 and through the secondary frames 50 extending angularly downwardly and rearwardly therefrom. The mounting of the variable displacement hydraulic motors, the pivotal support of the secondary frames 50, the rotational support of the wheel members 52 and the construction of the drive trains operatively interconnecting the hydraulic motors and the wheel members are preferably substantially identical to the apparatus shown in copending application Ser. No. 426,218, filed Sept. 28, 1982 now U.S. Pat. No. 4,454,925, the disclosure of which is incorporated herein by reference. The drawings of that patent show the hydraulic motors individual to the primary frames 36 and 38 in more detail, see FIGS. 3 and 4 of U.S. Pat. No. 4,454,925.

The container handling vehicle comprises a skid steered vehicle. That is, both the speed and the direction of movement of the apparatus 30 depends entirely upon the speed and direction of operation of the wheel members 52 of one of the main frames relative to the speed and direction of operation of the wheel members 52 associated with the other main frame. For example, assume that the wheel members 52 on one side of the vehicle are operated at a predetermined speed in the forward direction and that the wheel members 52 on the opposite side of the vehicle are operated at the same speed in the opposite direction. Under such circumstances the container handling apparatus 30 pivots about a vertical axis 124 with all of the components of the material handling apparatus entirely contained within a circle 126. Alternatively, if the wheel members 52 on one side of the vehicle are locked and the wheel members 52 on the opposite of the vehicle are operated in either direction, the material handling apparatus 30 pivots about a vertical axis that is substantially aligned with the locked wheel members 52. If the wheel members 52 on one side of the vehicle are operated at a relatively low speed and the wheel members 52 on the opposite side of the vehicle are operated at a relatively high speed but in the same direction, a somewhat larger turning radius is described. Finally, if the wheel members 52 on both sides of the vehicle are operated at the same speed and in the same direction, the material handling apparatus moves in a straight line, either forwardly or rearwardly.

Referring particularly to FIG. 1, there is illustrated a feature of the material handling apparatus which greatly facilitates the skid steering thereof. By selective actuation of the spring/shock absorber/cylinder assemblies 54, the centermost two wheel members 52 on each side of the apparatus may be positioned somewhat below the endmost wheel members 52 thereof. As is well known, the skid steering of a short wheel base vehicle requires considerably less power than is required to skid steer a similar vehicle having a longer wheel base. By positioning the centermost wheel members 52 of the apparatus 30 below the endmost wheel members thereof, the amount of power required to skid steer the apparatus is substantially reduced without sacrificing the stability that is afforded by means of the endmost wheel members 52. Thus, the container handling apparatus 30 affords the advantages of a short wheel base vehicle insofar as the power requirements for skid steering are concerned and the advantages of a long wheel base vehicle insofar as operational stability is concerned. As will be apparent, the spring/shock FIG. 19 illustrates the loading of the container handling apparatus 150 into an aircraft of the type known as a C130. Due to the eight wheel configuration of the container handling apparatus, the weight distribution on each of the wheels is well within the load limits of such an aircraft. Likewise, by means of the height reduction features of the version of the container handling apparatus illustrated in FIGS. 18 and 19, the overall height of the apparatus is well within the limits imposed by such an aircraft.

It will thus be understood that the present invention comprises a container handling apparatus incorporating numerous advantages over the prior art. For example, container handling apparatus incorporating the present invention are extremely adapted to military applications such as removal of containers directly from landing craft, transporting the containers through surf and across sand and other soft surfaces, transporting of containers over relatively improved surfaces at high speed, transporting containers across adverse terrain situations such as side slopes, obstacles such as trees, rocks, rubble, etc., obstacles such as crates an ditches, etc., and finally positioning each container at its ultimate destination. Container handling apparatus incorporating the invention are also readily adapted to the positioning of containers on and the removal of containers from other vehicles such as semi-trailers, full trailers, and the like. Container handling apparatus incorporated in the invention are highly manuverable, thereby facilitating the positioning of each container at its ultimate point of end use without requiring the unloading of the container into trucks for subsequent transportation of the container contents. Another advantage resulting from the use of the invention involves the ability to automatically receive, lift, transport, position, lower and disengage each container without the necessity of operator intervention. Other advantages derived from the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed but is capable of numerous rearrangements, modifications, and substitutions of parts and elements departing from the spirit of the invention.

We claim:

1. A container handling vehicle adapted to transport containers across adverse terrain comprising:

a pair of horizontal, longitudinally extending, parallel side frames, each side frame being supported by rotatably powered wheel members;

a selectively retractable arm having a main portion and an extendable portion mounted in a horizontal plane between one end of the pair of parallel side frames for selectively varying the separation distance between the frames from a relatively narrow width when the vehicle travels without a container to a relatively large width when the vehicle travels with a container;

a rectangular load beam having only a front rail, a rear rail and two side rails in a single plane;

a plurality of latching mechanisms on the load beam for latching engagement with conventional latch lugs on a container when the load beam is in the single plane;

lift means coupling the load beam to the parallel side frames of the vehicle for selectively positioning the load beam in elevation with respect to the parallel side frames;

a pair of hinge means mounted on the upper edges of the front rail and the rear rail to allow the front rail and the rear rail to fold downward to a position where the hinge means are below the side rails when the load beam is not latched to a container such that the front and rear rails intersect said horizontal plane of said retractible arm; and hydraulic means mounted on the front and rear rails of the load beam for folding the front and rear rails of the load beam downward from the single plane when the retractable arm moves the parallel side frames toward each other to cause the vehicle to assume the narrow width for traveling without a container.

* * * * *